Patented Nov. 20, 1934

1,981,027

UNITED STATES PATENT OFFICE 1,981,027

TEXTILE PRINTING PROCESS AND COMPOSITION

Herbert Bradley Briggs, South Reddish, and Richard Walter Hardacre, Cheetham Hill, England, assignors to Imperial Chemical Industries Limited, a corporation of Great Britain No Drawing. Application March 19, 1932, Serial No. 600,070. In Great Britain March 19, 1931

15 Claims. (Cl. 8—5)

This invention relates to the printing of textile materials, and more particularly refers to improvements in the printing of textile materials consisting of or containing both cellulose esters and cellulose itself in the form of either cotton or regenerated cellulose silk.

Dyestuffs of the direct dyeing azo group, also known as salt dyestuffs, may be applied to cotton or regenerated cellulose silk in the form of an ordinary printing paste, as is well known. It is further known that when they are so applied to cellulose esters no coloration, or at the most a mere staining, is produced; although a good coloration may be obtained on cellulose esters when the printing paste contains alkali. However, a sufficiently alkaline printing paste cannot be applied to cotton or regenerated cellulose silk because, in consequence most probably of interaction of the alkali with the cellulose, the azo dyestuff is reduced and a weak shade or a mere staining, sometimes of an objectionable hue, is obtained.

It will thus be seen that dyestuffs of the direct dyeing azo group could not be satisfactorily used for printing textile materials consisting of or containing both cellulose esters and cellulose itself in solid and uniform shades.

This invention has for an object the printing of textile materials consisting of or containing both cellulose esters and cellulose itself, the latter being present in the form of cotton or regenerated cellulose silk or a mixture of the two, in solid and uniform shades. Further objects will appear hereinafter.

These objects are attained by applying to the above mentioned textile materials a printing paste containing a direct dyeing dyestuff of the azo group and an alkali, the printing being effected in the presence of a soluble aromatic nitro compound.

The term "soluble aromatic nitro compound" is intended here to denote a benzene, toluene, naphthalene, or the like derivative containing a nitro group and a group such as sulpho- or carboxy-, capable of rendering the compound soluble in water or aqueous alkali. Naturally, the soluble aromatic nitro compound will preferably be not itself colored.

The invention will be further understood by a consideration of the following examples.

Example I

One (1) part of Chlorazol dark green PL (Color Index No. 583) was dissolved in 9 parts of water and 70 parts of British gum thickening 30%, 6 parts of the sodium salt of m-nitrobenzene sulphonic acid and 14 parts of caustic soda solution 90° Tw., were added. This paste was printed on to a "union fabric" consisting of cellulose acetate and viscose silk, and the fabric, after drying, was steamed for ¾–1 hour with moist steam at 100° C. and finally washed in water to remove the thickening agent. A solid uniform green shade was produced on the printing portions of the material.

Example II

The material consisting of cellulose acetate and viscose silk was padded in a 2% aqueous solution of sodium m-nitrobenzene-sulphonate, dried, and printed with a paste composed as follows: One (1) part of Chlorazol green BN (Color Index No. 593) dissolved in 12 parts of water, to which were added 73 parts of British gum thickening 30%, and 14 parts of caustic soda solution 90° Tw. The printing material was then steamed and finished as described in the first example.

In carrying the invention into practical effect considerable variation in procedure and materials is permissible as will be obvious from the above examples and description. There may be added to a printing paste containing a direct dyeing dyestuff of the azo group a suitable proportion (preferably from 5–10%) of an alkali and sodium m-nitrobenzene sulphonate. The resulting paste is applied to the textile material in the customary manner.

Similar results were obtained when in place of Chlorazol dark green PL the following direct dyeing azo compounds were used:—Chlorazol sky blue FF (Color Index No. 518), Chlorazol fast pink BK (Color Index No. 353), Chrysophemine G (Color Index No. 365).

In the above examples m-nitrobenzene sulphonic acid was used, but very satisfactory results may also be obtained by using m-nitrobenzoic acid, 1-nitro-naphthalene-6- or 7-sulphonic acid, or 1-chloro-4-nitrobenzene-2-sulphonic acid.

In addition to the advantages above described the soluble aromatic nitro compounds disclosed herein may also be used as resist salts. By means of this invention uniform solid shades are produced.

As many apparently widely different embodiments of this invention may be made without departing from the spirit and scope thereof, it is to be understood that we do not limit ourselves to the specific embodiments thereof except as defined in the appended claims.

We claim:

1. A process for producing printed shades on material containing both cellulose esters and cellulose itself in regenerated or natural form wherein the material is printed with a paste comprising a direct azo dye and an alkali in the presence of a non-dyeing water-soluble aromatic nitro compound, which compound does not combine with the direct azo dye.

2. A process for producing printed shades on material containing both cellulose esters and cellulose itself in regenerated or natural form wherein the material is printed with a paste comprising a direct azo dye, an alkali and a water-soluble aromatic nitro compound of the benzene or naphthalene series, which compound does not posses dyeing qualities in itself and does not combine with the direct azo dye.

3. A process for producing solid printed shades on material containing both cellulose esters and cellulose itself in regenerated or natural form wherein the material is printed with a paste containing a direct azo dyestuff, an alkali, and sodium m-nitrobenzene sulphonate.

4. A process for producing printed shades on material containing both cellulose esters and cellulose itself in regenerated or natural form wherein the material is padded with a non-dyeing water-soluble aromatic nitro compound and subsequently printed with a paste comprising a direct azo dye and an alkali, which aromatic nitro compound does not combine with the direct azo dye.

5. A process for producing solid printed shades on material containing both cellulose esters and cellulose itself in regenerated or natural form wherein the material is padded with sodium m-nitrobenzene sulphonate, dried, and printed with a paste containing a direct azo dyestuff and an alkali.

6. A composition of matter comprising a direct azo dye, an alkali and a water-soluble aromatic nitro compound of the benzene or naphthalene series, which compound is not a dyestuff and does not combine with the direct azo dye.

7. A composition of matter comprising a direct azo dyestuff, an alkali, and sodium m-nitrobenzene sulphonate.

8. The process comprising printing a "union fabric", comprising cellulose acetate and viscose silk, with a paste composed of about 1 part Chlorazol dark green PL (Color Index No. 583) dissolved in about 9 parts of water and about 70 parts of British gum thickening about 30%, to which is added about 6 parts of sodium m-nitrobenzene sulphonate and about 14 parts of caustic soda solution about 90° Tw., the material thus printed being dried, steamed for about ¾–1 hour with moist steam at about 100° C., and finally washed in water.

9. The process wherein a "union fabric", comprising cellulose acetate and viscose silk, is padded in about a 2% aqueous solution of sodium m-nitrobenzene sulphonate, dried, and printed with a paste composed of about 1 part Chlorazol green BN (Color Index No. 593) dissolved in about 12 parts of water to which is added about 73 parts of British gum thickening agent about 30% and about 14 parts of caustic soda solution about 90° Tw., the material thus printed being dried, steamed for about ¾–1 hour with moist steam at about 100° C., and finally washed in water.

10. A process for printing material containing both cellulose esters and cellulose itself in regenerated or natural form wherein the material is printed with a paste comprising a direct azo color selected from the group consisting of Chlorazol dark green PL, Chlorazol green BN, Chlorazol sky blue FF, Chlorazol fast pink BK, and Chrysophemine G, an alkali, and a soluble aromatic nitro compound selected from the group consisting of m-nitrobenzene-sulfonic acid, m-nitrobenzoic acid, 1-nitro-naphthalene-6- or 7-sulfonic acid, and 1-chloro-4-nitrobenzene-2-sulfonic acid.

11. The process of claim 10 wherein the material is first padded with the soluble aromatic nitro compound and then printed with the paste comprising the direct azo color and an alkali.

12. A process for printing material containing both cellulose esters and cellulose itself in regenerated or natural form wherein the material is printed with a paste comprising Chlorazol dark green PL, caustic soda, and m-nitrobenzene-sulfonic acid.

13. A process for printing material containing both cellulose esters and cellulose itself in regenerated or natural form wherein the material is padded with m-nitrobenzene-sulfonic acid, and subsequently printed with a paste comprising Chlorazol green BN, and caustic soda.

14. A composition of matter comprising a direct azo color selected from the group consisting of Chlorazol dark green PL, Chlorazol green BN, Chlorazol sky blue FF, Chlorazol fast pink BK, and Chrysophemine G, an alkali and a soluble aromatic nitro compound selected from the group consisting of m-nitrobenzene-sulfonic acid, m-nitrobenzoic acid, 1-nitro-naphthalene-6- or 7-sulfonic acid, and 1-chloro-4-nitrobenzene-2-sulfonic acid.

15. A composition of matter comprising Chlorazol dark green PL, caustic soda, and m-nitrobenzene-sulfonic acid.

HERBERT BRADLEY BRIGGS.
RICHARD WALTER HARDACRE.